(12) United States Patent
Pfaller et al.

(10) Patent No.: US 11,655,021 B2
(45) Date of Patent: May 23, 2023

(54) ROTARY WING AIRCRAFT WITH AN ASYMMETRICAL REAR SECTION

(71) Applicant: AIRBUS HELICOPTERS DEUTSCHLAND GMBH, Donauworth (DE)

(72) Inventors: Rupert Pfaller, Riemerling (DE); Tobias Ries, Nordendorf (DE)

(73) Assignee: AIRBUS HELICOPTERS DEUTSCHLAND GMBH, Donauworth (DE)

( * ) Notice: Subject to any disclaimer, the term of this patent is extended or adjusted under 35 U.S.C. 154(b) by 21 days.

(21) Appl. No.: 17/376,576

(22) Filed: Jul. 15, 2021

(65) Prior Publication Data

US 2022/0185465 A1    Jun. 16, 2022

(30) Foreign Application Priority Data

Dec. 14, 2020   (EP) .................................... 20400024

(51) Int. Cl.
*B64C 27/82*   (2006.01)
*B64C 1/00*    (2006.01)
*B64C 27/06*   (2006.01)

(52) U.S. Cl.
CPC ............ *B64C 27/82* (2013.01); *B64C 1/0009* (2013.01); *B64C 27/06* (2013.01); *B64C 2027/8236* (2013.01); *B64C 2027/8272* (2013.01); *B64C 2027/8281* (2013.01)

(58) Field of Classification Search
CPC ....... B64C 27/82; B64C 1/0009; B64C 27/06; B64C 2027/8236; B64C 2027/8272; B64C 2027/8281
See application file for complete search history.

(56) References Cited

U.S. PATENT DOCUMENTS

| | | |
|---|---|---|
| 2,452,355 A | 10/1948 | Nall |
| 3,241,791 A | 3/1966 | Piasecki |
| 4,928,907 A | 5/1990 | Zuck |
| 5,108,044 A | 4/1992 | Weiner et al. |
| 5,209,430 A | 5/1993 | Wilson et al. |

(Continued)

FOREIGN PATENT DOCUMENTS

| | | |
|---|---|---|
| EP | 1395489 A2 | 3/2004 |
| EP | 2511177 A1 | 10/2012 |

(Continued)

OTHER PUBLICATIONS

European Search Report for European Application No. EP 20400024. 4, Completed by the European Patent Office, dated May 12, 2021. 9 pages.

*Primary Examiner* — Justin M Benedik
(74) *Attorney, Agent, or Firm* — Brooks Kushman P.C.

(57) ABSTRACT

A rotary wing aircraft that extends along an associated roll axis between a nose region and an aft region and that comprises a fuselage with a front section and a rear section, the rotary wing aircraft comprising: a main rotor that is rotatably mounted at the front section, a shrouded duct that is arranged in the aft region, and a propeller that is rotatably mounted to the shrouded duct, wherein the rear section extends between the front section and the shrouded duct and comprises an asymmetrical cross-sectional profile in direction of the associated roll axis.

14 Claims, 13 Drawing Sheets

(56) References Cited

U.S. PATENT DOCUMENTS

| | | | |
|---|---|---|---|
| 8,840,058 B2* | 9/2014 | Brand | ................ B64C 27/82 244/17.19 |
| 9,409,643 B2* | 8/2016 | Mores | ................ B64C 27/06 |
| 2003/0106958 A1 | 6/2003 | Gold et al. | |
| 2012/0280079 A1* | 11/2012 | Brand | ................ B64C 27/82 244/17.19 |
| 2015/0191245 A1* | 7/2015 | Mores | ................ B64C 27/06 244/17.19 |

FOREIGN PATENT DOCUMENTS

| | | |
|---|---|---|
| EP | 2687442 A1 | 1/2014 |
| EP | 2808253 A1 | 12/2014 |
| EP | 2957502 A1 | 12/2015 |
| EP | 3317180 A2 | 5/2018 |
| FR | 2897040 A1 | 8/2007 |
| JP | H0733091 A | 2/1995 |
| RU | 2282565 C2 | 8/2006 |
| WO | 2002087967 A2 | 11/2002 |
| WO | 2014176431 A1 | 10/2014 |
| WO | 2017027112 A2 | 2/2017 |
| WO | 2020079649 A1 | 4/2020 |

\* cited by examiner

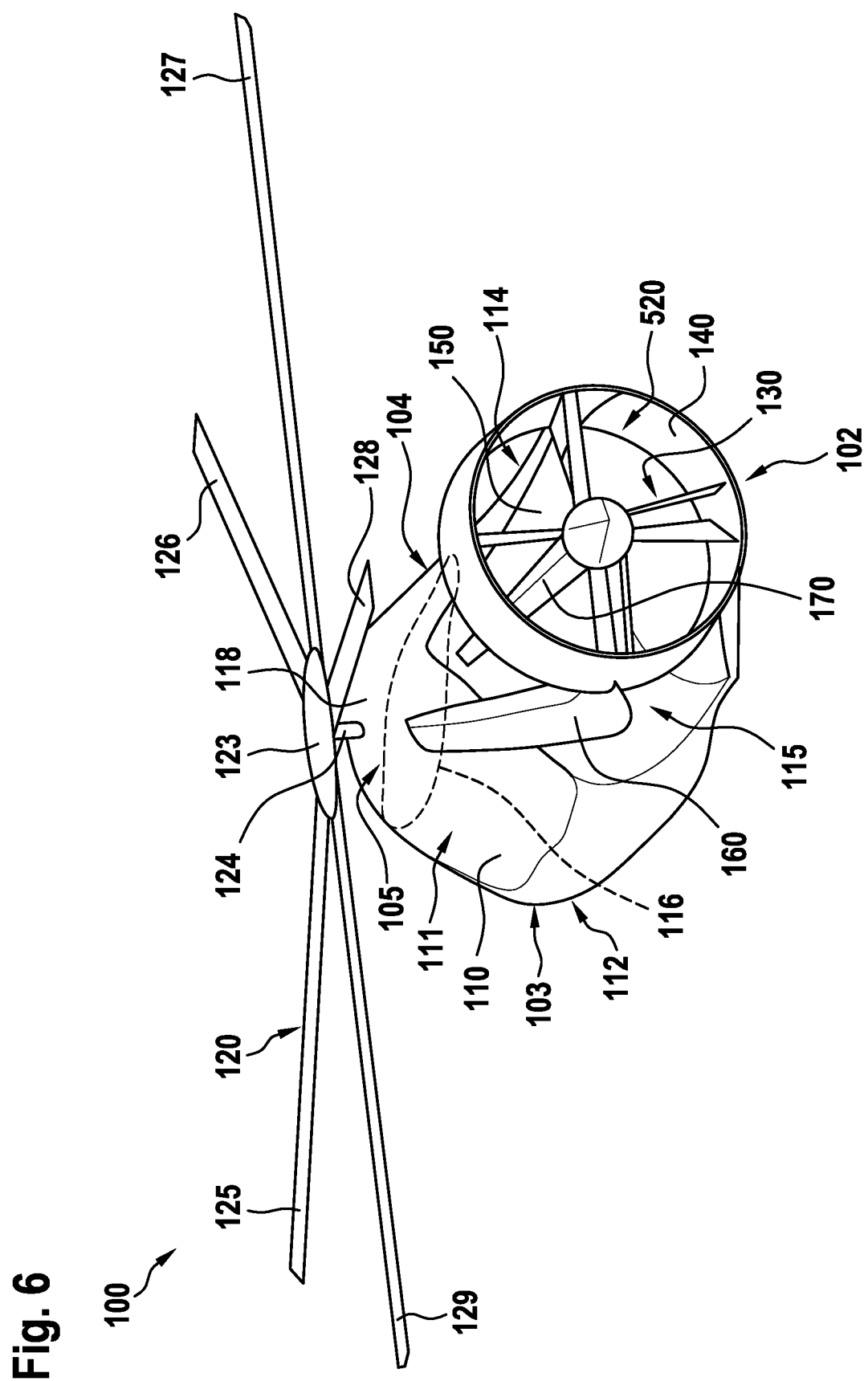

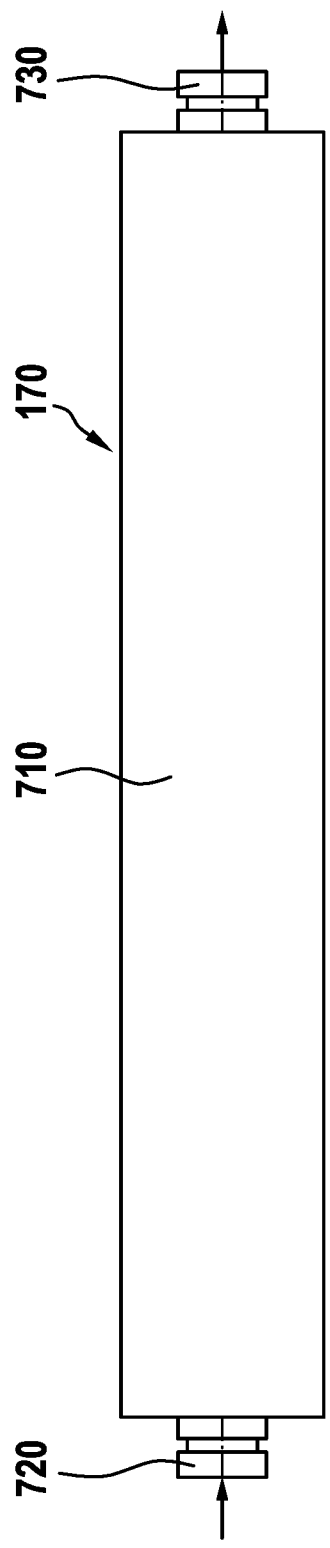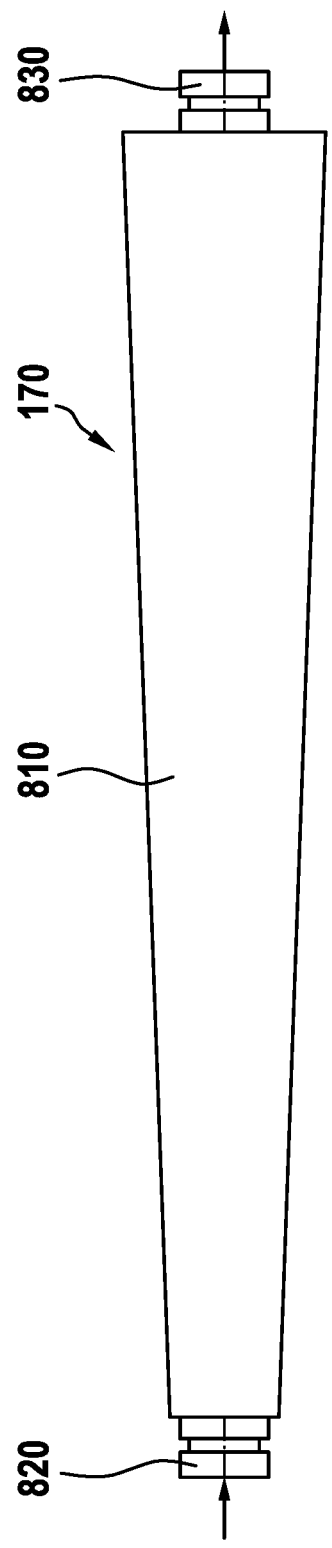

ROTARY WING AIRCRAFT WITH AN ASYMMETRICAL REAR SECTION

CROSS-REFERENCE TO RELATED APPLICATIONS

This application claims priority to European patent application No. EP 20400024.4 filed on Dec. 14, 2020, the disclosure of which is incorporated in its entirety by reference herein.

TECHNICAL FIELD

The present disclosure relates to a rotary wing aircraft that extends along an associated roll axis between a nose region and an aft region and that comprises a fuselage with a front section and a rear section, wherein the rotary wing aircraft further comprises a main rotor that is rotatably mounted at the front section, a shrouded duct that is arranged in the aft region, and a propeller that is rotatably mounted to the shrouded duct.

BACKGROUND

An example for a rotary wing aircraft with a main rotor and a propeller is a so-called compound helicopter. In such a compound helicopter, the main rotor accomplishes essentially lifting duties, but usually also accomplishes propulsive duties at least at low or medium forward speeds in forward flight of the compound helicopter. The propeller, in turn, is mainly provided to off-load the main rotor from its propulsive duties at higher forward speeds in forward flight and may enable the compound helicopter to travel with comparatively high forward speeds which would not be reachable by use of the main rotor alone.

However, in operation the main rotor creates a torque around the yaw axis of the compound helicopter. This torque must be counteracted by a suitable anti-torque device to guarantee a required yaw stability of the compound helicopter in flight operation.

The document U.S. Pat. No. 3,241,791 describes a compound helicopter with a main rotor and a tail propeller. The tail propeller is mounted to a circular shroud which is attached to the compound helicopter's fuselage. The circular shroud is further provided with a rudder that is pivotally mounted to the circular shroud downstream of the tail propeller. In operation, the tail propeller creates an air stream which is directed through the circular shroud toward the rudder and which may be deflected by the rudder to counteract the torque created by the main rotor.

The document U.S. Pat. No. 4,928,907 describes a compound helicopter with a main rotor, a tail boom, and a tail propeller mounted to an aft region of the tail boom, wherein the tail propeller is used only for forward thrust during an airplane mode of flight and during transition from vertical helicopter flight to forward airplane mode of flight, when the main rotor may be feathered in a no-lift attitude. Required anti-torque balancing forces during hovering mode are developed by differentially controlled aileron forces when respective wings are aligned vertically with main rotor downwash. Furthermore, a vertically moveable horizontal airfoil is provided on the tail boom, with controllable means which can provide anti-torque reaction forces from the main rotor downwash during the hovering mode.

The document EP 1 395 489 A2 describes a compound helicopter with a main rotor, a tail propeller, and a tail boom extending through an area of downwash from the main rotor. The tail boom forms a plenum chamber to which associated linear nozzles are connected. The associated linear nozzles are fixedly coupled to the tail boom and adapted to discharge a sheet of fluid created from pressurized air in the plenum chamber in a direction substantially tangential to an outer surface of the tail boom to divert main rotor downwash and thereby produce a force that counteracts biasing torque created by the main rotor. The pressurized air is provided by a fan or by directing exhaust air from a power plant of the compound helicopter into the plenum chamber. The compound helicopter further comprises a yaw control member which is movably coupled to the tail boom and selectively positionable based on pilot input.

The document EP 2 511 177 A1 describes a compound helicopter with a main rotor, a tail propeller and a tail boom that is surrounded by a cycloidal rotor. The cycloidal rotor has individual blades which are essentially parallel to the longitudinal axis of the tail boom. In operation, the cycloidal rotor is driven to provide anti-torque that counteracts biasing torque created by the main rotor.

However, the above-described anti-torque devices for compound helicopters with a main rotor and a propeller are generally complex and require actuatable components, such as rudders, differentially controlled ailerons or moveable airfoils, additional fans, pilot-moveable yaw control members, or cycloidal rotors. These actuatable components increase an overall system complexity and an overall weight of these anti-torque devices.

Various other anti-torque devices are known from conventional helicopters which, in contrast to the above-described compound helicopters, are not provided with a propeller. In such conventional helicopters, wherein a respective main rotor creates torque around the helicopter's yaw axis, usually a tail rotor is provided as anti-torque device to provide anti-torque that counteracts the torque created by the respective main rotor. Moreover, as main rotor downwash of such a conventional helicopter generally flows around its tail boom, the tail boom may be provided with additional anti-torque devices in the form of strakes or vortex generators to alter the flow of downwash in order to generate a compensation force that counteracts at least partially the torque created by the respective main rotor such that a respective down-sizing of the tail rotor is enabled. Furthermore, a fairing may be added as additional anti-torque device to the tail boom of such a conventional helicopter to create the compensation force, or the profile of the tail boom as such may be modified. Other additional anti-torque devices may likewise be added to the tail boom, such as e.g., a rotating cylinder that use the so-called Magnus effect to generate the compensation force. Illustrative conventional helicopters with main rotors, tail rotors and such additional anti-torque devices are described in the documents EP 3 317 180 A2, WO 2014/176431 A1, and U.S. Pat. No. 5,209,430 A.

If a respectively created compensation force suffices to counteract biasing torque created by the main rotor, it is also possible to omit provision of the tail rotor. Illustrative helicopters with a main rotor and an anti-torque device that enables omission of a respective tail rotor are described in the documents FR 2 897 040 A1, RU 2 282 565 C2, and U.S. Pat. No. 2,452,355 A.

Nevertheless, most of the above-described anti-torque devices of conventional helicopters are not suitable for use in a compound helicopter with a main rotor and a tail propeller as they require presence of a conventional tail rotor. However, a conventional tail rotor has usually a comparatively high power consumption, especially in hover condition, and is quite noisy. In contrast, the above-described anti-torque devices which do not need presence of a conventional tail rotor are bulky and/or require actuatable components, such as additional fans, rotatable truncated cones or rotatable cylinders. These actuatable components, however, increase an overall system complexity and an overall weight of the anti-torque devices.

SUMMARY

It is, therefore, an object of the present disclosure to provide a new compound helicopter and, more generally, a new rotary wing aircraft with a main rotor and a tail propeller, which is equipped with an improved anti-torque device that exhibits a comparatively low overall system complexity and a reduced overall weight.

This object is solved by a rotary wing aircraft with a main rotor and a tail propeller, said rotary wing aircraft comprising the features of claim 1. More specifically, according to the present disclosure a rotary wing aircraft is provided that extends along an associated roll axis between a nose region and an aft region and that comprises a fuselage with a front section and a rear section. The rotary wing aircraft comprises a main rotor that is rotatably mounted at the front section, a shrouded duct that is arranged in the aft region, and a propeller that is rotatably mounted to the shrouded duct. The rear section extends between the front section and the shrouded duct and comprises an asymmetrical cross-sectional profile in direction of the associated roll axis. Furthermore, the rear section is configured to generate sideward thrust for main rotor anti-torque from main rotor downwash.

Advantageously, by forming the rear section of the fuselage such that the rear section is configured to generate sideward thrust for main rotor anti-torque from main rotor downwash, a passive anti-torque device may be provided, which is at least approximately self-balancing. This passive anti-torque device does not require any complex actuation mechanism, thereby avoiding the weight and the need for redundancy of an active system. Accordingly, a reduced overall system complexity of the inventive passive anti-torque device may be obtained and, consequently, a required maintenance effort for the anti-torque device will be comparatively low.

Furthermore, as no conventional tail rotor is required for generating anti-torque, less power is needed in hover condition, in which a conventional tail rotor usually consumes up to 13% of the overall consumed power. Thus, less fuel is needed and a gain of lifting capacity may be obtained.

In an illustrative realization, in order to enable generation of high sideward thrust for main rotor anti-torque from main rotor downwash, the rear section of the fuselage of the compound helicopter preferably exhibits a shape that is similar to a profile of a so-called high lift airfoil, such that comparatively high sideward thrust may already be generated at comparatively low downwash air speed. Preferably, at least the main part of the rear section of the fuselage is asymmetrically located to a side of the compound helicopter that is farther away from an approaching rotor blade of the main rotor in the sense of rotation of the main rotor. In other words, if the main rotor rotates in counterclockwise direction, the main part of the rear section of the fuselage is located at the starboard side of the compound helicopter.

Preferably, a vertical cut through the rear section of the fuselage at a position that is close to the shrouded duct resembles to a high lift airfoil. This high lift airfoil is orientated at that position preferably at least approximately in vertical direction providing "lift", i.e., sideward thrust in the same direction in which the main rotor is rotating. In other words, if the main rotor rotates in counterclockwise direction, the sideward thrust likewise points into this direction.

Thus, less power is needed in hover condition as generation of downward drag in response to main rotor downwash is reduced due to a transformation of the main rotor downwash into sideward thrust, compared to the downward drag that is created by a conventional tail boom in response to main rotor downwash. Consequently, a gain of lifting capacity and fuel savings may be realized.

Advantageously, an underlying transition from a cross-sectional profile of the compound helicopter's fuselage in the region of the main rotor, which may be symmetrical similar to a cross-sectional profile of a conventional helicopter, to the high lift airfoil-shaped cross-sectional profile of the rear section of the fuselage is preferably performed by a smooth recess which is shaped in order to avoid airflow separation. Similarly, an underlying transition of the rear section of the fuselage to the shrouded duct is also preferably smooth, such that the rear section of the fuselage has at least approximately a shaping that corresponds to one quarter of the shrouded duct.

In addition to the rear section of the fuselage, at least one wing-type aerodynamic device, which is also referred to as the "support wing" hereinafter, may be provided for generation of sideward thrust for main rotor anti-torque from main rotor downwash. In operation of the compound helicopter, a certain amount of main rotor downwash is present mainly in hover condition. Therefore, "lift" in horizontal direction, i.e., sideward thrust, may advantageously be generated simultaneously by the rear section of the fuselage and the support wing from the main rotor downwash in order to counteract the torque created by the main rotor in the hover condition.

Preferably, the support wing is mainly oriented vertically. More specifically, the support wing may connect the compound helicopter's upper deck to the shrouded duct, e.g., from slightly behind of the main rotor to the shrouded duct. Advantageously, the support wing also exhibits a shape that is similar to a profile of a high lift airfoil. Preferably, the support wing has its greatest width at an area located between 60% of the length of the main rotor's rotor blades and an outer end of the rotor blades.

Advantageously, the support wing and the rear section of the fuselage support the shrouded duct on both sides of the compound helicopter, as there is no center part of the rear section of the fuselage, compared to a conventional tail boom. Preferably, a tail propeller drive shaft is arranged between the support wing and the rear section of the fuselage. This tail propeller drive shaft may also generate sideward thrust via the so-called Magnus effect, which occurs if a cylinder or cone is rotated in an airflow that is oriented perpendicular to its rotation axis.

The tail propeller drive shaft is preferably rotatably mounted to the shrouded duct, preferentially via a bearing that is supported by a predetermined number of provided stator profiles, such as e.g., three stator profiles. Preferably the stator profiles are mounted to the shrouded duct close to a respective location of the support wing and upper and lower edges of the rear section of the fuselage, where it is connected to the shrouded duct.

Alternatively, instead of providing a tail propeller drive shaft, the tail propeller may be powered independent of the main rotor, e.g., by means of a separate engine. This separate engine may be of a different type than a respective main engine that powers the main rotor such that engine hybridization is enabled with high redundancy, as the compound helicopter may be operated in forward flight with each one of the engines independent of the other one.

According to one aspect, the front section comprises a port side wall and a starboard side wall, and the rear section extends in prolongation to one of the port side wall or the starboard side wall.

According to one aspect, the rear section comprises at least one airfoil-shaped aerodynamic device that extends from the front section to the shrouded duct. The at least one airfoil-shaped aerodynamic device is configured to generate sideward thrust for main rotor anti-torque from main rotor downwash.

According to one aspect, the at least one airfoil-shaped aerodynamic device comprises a deflectable flap.

According to one aspect, the rear section comprises at least one rotatable airfoil-shaped aerodynamic device that is configured to generate sideward thrust for main rotor anti-torque from main rotor downwash. The at least one rotatable airfoil-shaped aerodynamic device is rotatable to enable adjustment of the generated sideward thrust.

According to one aspect, the asymmetrical cross-sectional profile is at least approximately C-shaped.

According to one aspect, the rotary wing aircraft further comprises at least one wing-type aerodynamic device that extends between the front section and the shrouded duct. The at least one wing-type aerodynamic device and the rear section are connected to opposite sides of the shrouded duct.

According to one aspect, the at least one wing-type aerodynamic device is mounted to the shrouded duct and to an aircraft upper deck and has a width that increases from the aircraft upper deck over a predetermined length of the at least one wing-type aerodynamic device, preferably over at least 75% of the length of the at least one wing-type aerodynamic device.

According to one aspect, the at least one wing-type aerodynamic device is configured to generate sideward thrust for main rotor anti-torque from main rotor downwash.

According to one aspect, the at least one wing-type aerodynamic device is rotatable to enable adjustment of the generated sideward thrust.

According to one aspect, the at least one wing-type aerodynamic device comprises a deflectable flap.

According to one aspect, the rotary wing aircraft further comprises an uncovered propeller drive shaft that is configured to create a Magnus effect upon rotation in main rotor downwash.

By using an uncovered propeller drive shaft, provision of a respective drive shaft cowling may be omitted. Thus, an overall weight and respective costs of the compound helicopter may advantageously be reduced.

According to one aspect, the uncovered propeller drive shaft extends coupling- and bearing-free between the front section and the shrouded duct.

According to one aspect, the uncovered propeller drive shaft comprises a big diameter cylinder shaft or a big diameter conical shaft.

According to one aspect, the rotary wing aircraft is embodied as a compound helicopter, wherein the front section of the fuselage forms a cabin for passengers and/or cargo, wherein the propeller is a pusher propeller, and wherein the main rotor forms a single rotor plane.

Thus, an improved compound helicopter with a reduced total number of constituting components and a reduced overall system complexity may be provided. This improved compound helicopter is embodied for an efficient cruise flight and enables higher flight speeds than usually achievable with conventional compound helicopters.

BRIEF DESCRIPTION OF THE DRAWINGS

Preferred embodiments of the disclosure are outlined by way of example in the following description with reference to the attached drawings. In these attached drawings, identical or identically functioning components and elements are labeled with identical reference numbers and characters and are, consequently, only described once in the following description.

FIG. 6 shows another perspective view of the rotary wing aircraft of FIG. 1 to FIG. 5, FIG. 7 shows a side view of a propeller drive shaft of the rotary wing aircraft of FIG. 1 to FIG. 6 according to a first embodiment, FIG. 8 shows a side view of a propeller drive shaft of the rotary wing aircraft of FIG. 1 to FIG. 6 according to a second embodiment.

DETAILED DESCRIPTION

Figure 1:
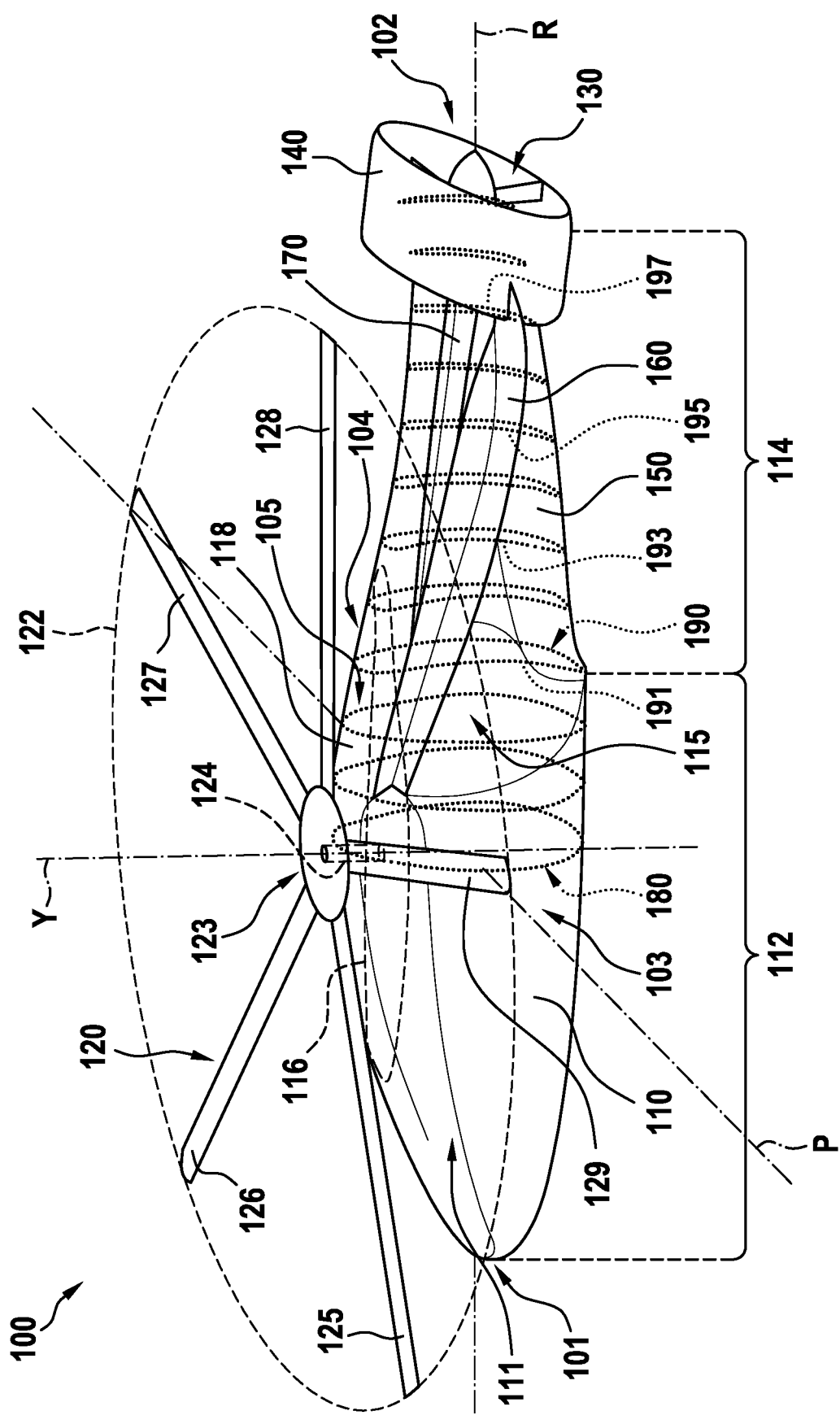
FIG. 1 shows a perspective view of a rotary wing aircraft with a fuselage according to the present disclosure.

FIG. 1 shows an illustrative rotary wing aircraft 100 with a fuselage 110 and a main rotor 120. By way of example, the rotary wing aircraft 100 is shown with three mutually orthogonal axes P, R, and Y. The axis P represents a transversal axis that corresponds to the pitch axis inherent to the rotary wing aircraft 100, the axis R represents a longitudinal axis that corresponds to the roll axis inherent to the rotary wing aircraft 100, and the axis Y represents a vertical axis that corresponds to the yaw axis inherent to the rotary wing aircraft 100.

By way of example, the rotary wing aircraft 100 is illustrated in forward flight. Thus, only components that are required for forward flight and that are related to the present disclosure are illustrated in more detail, while illustration of other components is omitted, for simplicity and clarity of the drawing. For instance, neither the fuselage 110 is illustrated in greater detail for showing e.g., respective doors and windows, nor a possible landing gear, which may be a wheel-tape landing gear or a skid-type landing gear mounted to the fuselage 110, is shown, and so on.

Illustratively, the fuselage 110 extends along the roll axis R from a nose region 101 to an aft region 102 of the rotary wing aircraft 100. The fuselage 110 comprises a front section 112 and a rear section 114. Illustratively, the front section 112 comprises a port side wall 103 and a starboard side wall 104. Preferably, the rear section 114 extends in prolongation to one of the port side wall 103 or the starboard side wall 104.

More specifically, the rear section 114 preferably extends in prolongation to a side of the fuselage 110 that is farther away from an approaching rotor blade of the main rotor 120 in the sense of rotation of the main rotor 120. Assuming that the main rotor 120 rotates in counterclockwise direction, the rear section 114 of the fuselage 110 would be located at the starboard side of the compound helicopter 100 and, thus, be arranged in prolongation to the starboard side wall 104 as illustrated.

By way of example, the front section 112 merges into the rear section 114 at an associated transition or recess area 115. In other words, starting at the nose region 101 of the fuselage 110 and travelling along the roll axis R, the fuselage 110 has the front section 112 that merges at the transition or recess area 115 into the rear section 114 that, in turn, terminates in the aft region 102.

The front section 112 preferably forms a cabin 111 for passengers and/or cargo. The cabin 111 and, more generally, the fuselage 110 illustratively comprises an upper limit 116 that separates the cabin 111 from an upper deck 105. The upper deck 105 is preferably covered by a cowling 118. By way of example, the cowling 118 may cover one or more suitable engines and a main gear box that rotates the main rotor 120 in operation. Accordingly, the main rotor 120 is rotatably mounted at the front section 112 of the fuselage 110.

Preferably, the main rotor 120 forms a single rotor plane 122 and is adapted to provide lift and forward or backward thrust during operation. Illustratively, the main rotor 120 is embodied as a multi-blade main rotor with a plurality of rotor blades 125, 126, 127, 128, 129 which are coupled at an associated rotor head 123 to a rotor mast 124, which rotates in operation of the rotary wing aircraft 100 around an associated rotor axis.

According to one aspect, the rotary wing aircraft 100 is embodied as a compound helicopter with a propeller 130 that is at least adapted for generating forward thrust in operation. Accordingly, the rotary wing aircraft 100 is referred to hereinafter as the "compound helicopter 100", for simplicity and clarity.

The propeller 130 and the main rotor 120 may be driven completely independent from each other. In particular, different types of engines may be used to drive the propeller 130 and the main rotor 120, such as e.g., an air breathing propulsion engine for the main rotor 120 and an electric motor for the propeller 130.

Preferably, the propeller 130 is rotatably mounted to a shrouded duct 140. Illustratively, the shrouded duct 140 is mounted to the rear section 114 of the fuselage 110 and, more specifically, arranged in the aft region 102 of the compound helicopter 100. Accordingly, the propeller 130 forms a tail propeller and, more particularly, preferably a pusher propeller.

The rear section 114 of the fuselage 110 illustratively extends between the front section 112 of the fuselage 110 and the shrouded duct 140. Preferably, the rear section 114 comprises an asymmetrical cross-sectional profile 190 in direction of the roll axis R of the compound helicopter 100 and is configured to generate sideward thrust for main rotor anti-torque from main rotor downwash. According to one aspect, the asymmetrical cross-sectional profile 190 is at least approximately C-shaped, as illustrated by way of example with a series of cross-sectional profiles 191, 193, 195, 197. In contrast to the rear section 114, the front section 112 of the fuselage 110 may at least partly exhibit a symmetrical cross-sectional profile, as e.g., illustrated in the region of the rotor mast 124 by means of a symmetrical cross-sectional profile 180.

It should be noted that the cross-sectional profiles 180, 191, 193, 195, 197 clarify the function of the recess area 115. In fact, the cross-sectional profile 180 has an almost oval shape, which is by way of example approximately egg-shaped. This oval shape merges at the recess area 115 into an airfoil shape, which is at least approximately C-shaped, as illustrated by the cross-sectional profiles 191, 193, 195, 197.

Preferably, the rear section 114 comprises at least one airfoil-shaped aerodynamic device 150 that extends from the front section 112 to the shrouded duct 140. By way of example, only one airfoil-shaped aerodynamic device 150 is shown. This airfoil-shaped aerodynamic device 150 is illustratively arranged in prolongation to the starboard side wall 104.

In an illustrative realization, the airfoil-shaped aerodynamic device 150 is formed as or by a wing. This wing is, however, not arranged transversally to the roll axis R, but instead at least approximately in parallel to the roll axis R.

The airfoil-shaped aerodynamic device 150 may form the rear section 114, at least partly. According to one aspect, the airfoil-shaped aerodynamic device 150 is configured to generate sideward thrust for main rotor anti-torque from main rotor downwash.

In addition, the rear section 114 preferably further comprises at least one wing-type aerodynamic device 160 that extends between the front section 112 and the shrouded duct 140. By way of example, only one wing-type aerodynamic device 160 is shown. Illustratively, the wing-type aerodynamic device 160 is at least approximately arranged in prolongation to the port side wall 103.

Preferably, the wing-type aerodynamic device 160 is mounted to the shrouded duct 140 and to the upper deck 105 of the compound helicopter 100. Illustratively, the wing-type aerodynamic device 160 and the airfoil-shaped aerodynamic device 150 are connected to opposite sides of the shrouded duct 140. According to one aspect, the wing-type aerodynamic device 160 is also configured to generate sideward thrust for main rotor anti-torque from main rotor downwash of the compound helicopter 100.

According to one aspect, the compound helicopter 100 further comprises an uncovered propeller drive shaft 170 that is configured to create a Magnus effect upon rotation in main rotor downwash. The uncovered propeller drive shaft 170 is configured to drive the propeller 130 in operation and preferably extends coupling- and bearing-free between the front section 112 of the fuselage 110 and the shrouded duct 140.

Figure 2:
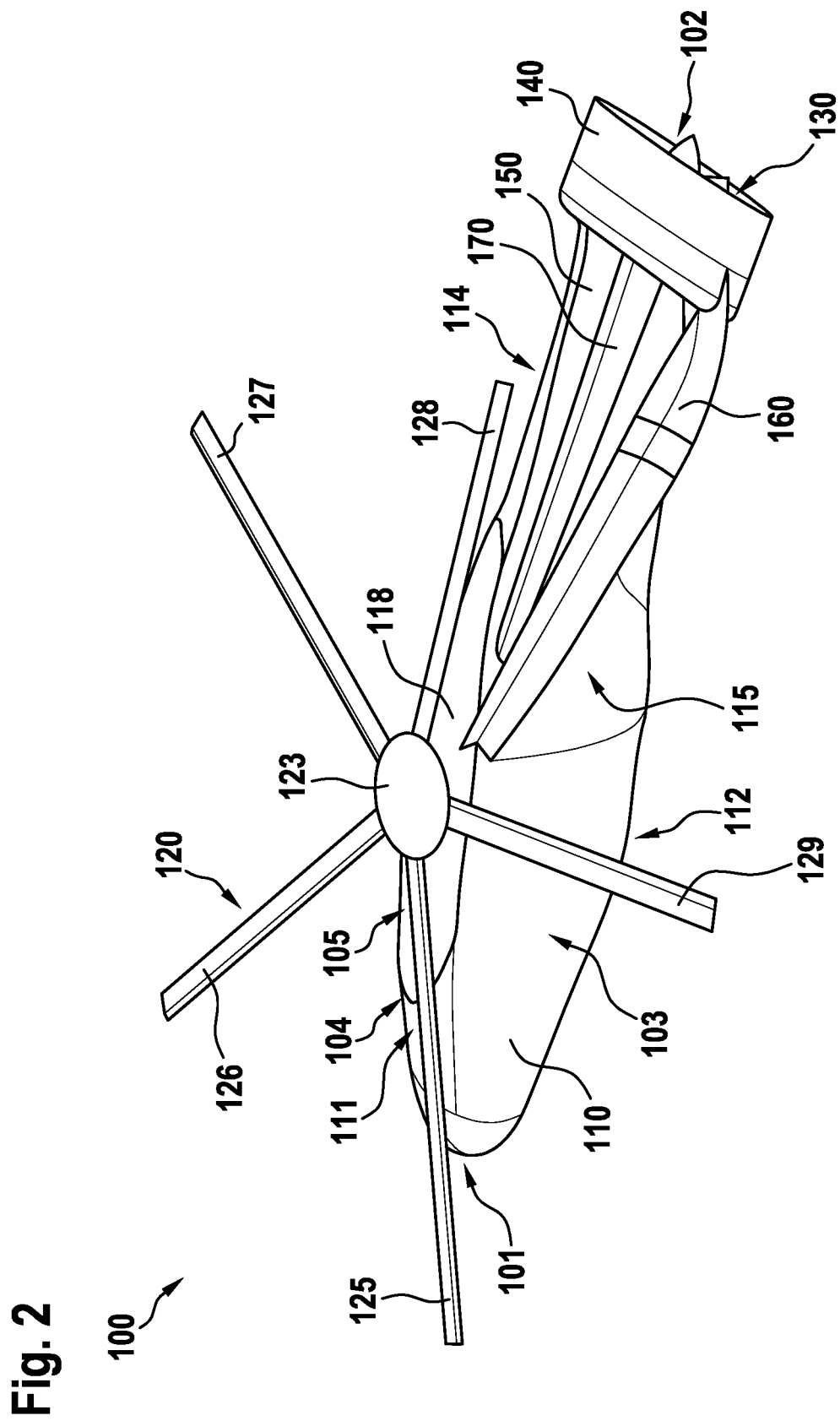
FIG. 2 shows another perspective view of the rotary wing aircraft of FIG. 1.

FIG. 2 shows the compound helicopter 100 of FIG. 1 with the fuselage 110, the main rotor 120, the propeller 130, the shrouded duct 140, and the uncovered propeller drive shaft 170. According to FIG. 1, the fuselage 110 comprises the front section 112 that merges at the recess area 115 into the rear section 114, the rear section 114 comprises the airfoil-shaped aerodynamic device 150 and the wing-type aerodynamic device 160, the propeller 130 is rotatably mounted to the shrouded duct 140 and driven by the uncovered propeller drive shaft 170, and the wing-type aerodynamic device 160 connects the upper deck 105 to the shrouded duct 140.

More particularly, FIG. 2 clarifies the coupling- and bearing-free extension of the uncovered propeller drive shaft 170 between the front section 112 of the fuselage 110 and the shrouded duct 140. In addition, merging of the front section 112 along the recess area 115 into the rear section 114 of the fuselage 110 is also further clarified and it can be recognized that the merging is essentially achieved by redirecting, i.e., deflecting the port side wall 103 of the compound helicopter 100 in the recess area 115 toward the starboard side wall 104 such that both walls 103, 104 are commonly connected to the shrouded duct's starboard side, i.e., the right-hand side of the shrouded duct 140. Moreover, the connection of the wing-type aerodynamic device 160 at the shrouded duct's port side, i.e., the left-hand side of the shrouded duct 140, which is preferably almost diametrically opposed to the connection of a respective upper edge of the airfoil-shaped aerodynamic device 150, is likewise further clarified.

Figure 3:
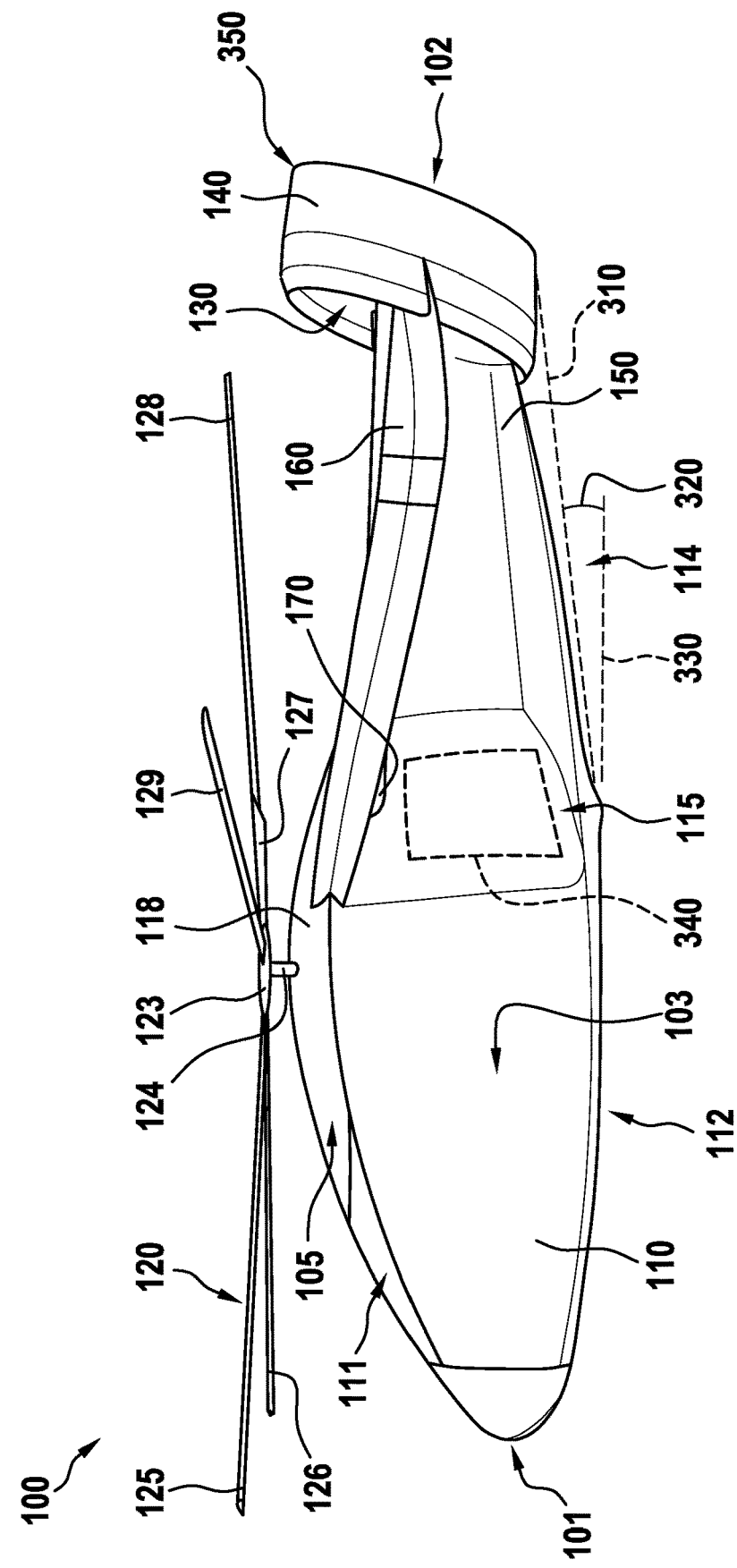
FIG. 3 shows a side view of the rotary wing aircraft of FIG. 1 and FIG. 2.

FIG. 3 shows the compound helicopter 100 of FIG. 1 with the fuselage 110, the main rotor 120, the propeller 130, the shrouded duct 140, and the uncovered propeller drive shaft 170. According to FIG. 1, the fuselage 110 comprises the front section 112 that merges at the recess area 115 into the rear section 114, the rear section 114 comprises the airfoil-shaped aerodynamic device 150 and the wing-type aerodynamic device 160, the propeller 130 is rotatably mounted to the shrouded duct 140 and driven by the uncovered propeller drive shaft 170, and the wing-type aerodynamic device 160 connects the upper deck 105 to the shrouded duct 140.

According to one aspect, the shrouded duct 140 forms a swept back structure 350. This swept back structure 350 is preferably provided to adapt main rotor downwash at the shrouded duct 140 to a preferred behavior of the compound helicopter 100 during transition from hover condition to forward flight.

Illustratively, a bottom line 310 of the rear section 114 of the fuselage 110 is shown. This bottom line 310 is preferably angled by a predetermined inclination angle 320 relative to a horizontal reference plane 330. By way of example, the predetermined inclination angle 320 is a positive (dihedral) angle that may be selected dependent on a required sideward thrust that is to be generated by the rear section 114 of the fuselage 110 in operation.

It should, nevertheless, be noted that the dihedral angle is only shown and described by way of example and not for restricting the present disclosure accordingly. Moreover, it should be noted that instead of selecting the illustrative dihedral angle e.g., a negative (anhedral) angle may likewise be selected for the predetermined inclination angle 320. In this case, an increase of up to 30% of generated sideward thrust may be obtained, resulting in a possibly achievable increase of more than 40% of a respectively generated counteracting moment.

Furthermore, according to one aspect a rear door 340 and/or additional equipment, such as e.g., a winch, may be arranged in the recess area 115. The rear door 340 may e.g., be a sliding or dual cantilever door. By way of example, the rear door 340 may be slidable into the fuselage 110, i.e., toward the cabin 111. Thus, in forward flight with opened door, there is no additional drag generated by the rear door 340.

Preferably, this rear door 340 is accessible from a rear side of the compound helicopter 100, i.e., coming from the rear section 114. Thus, the compound helicopter's cabin 111 may be loaded from the rear side. Advantageously, by positioning the rear door 340 in the recess area 115, penalties to the overall aerodynamic performance of the compound helicopter 100 due to the rear door 340 may be avoided.

Figure 4:
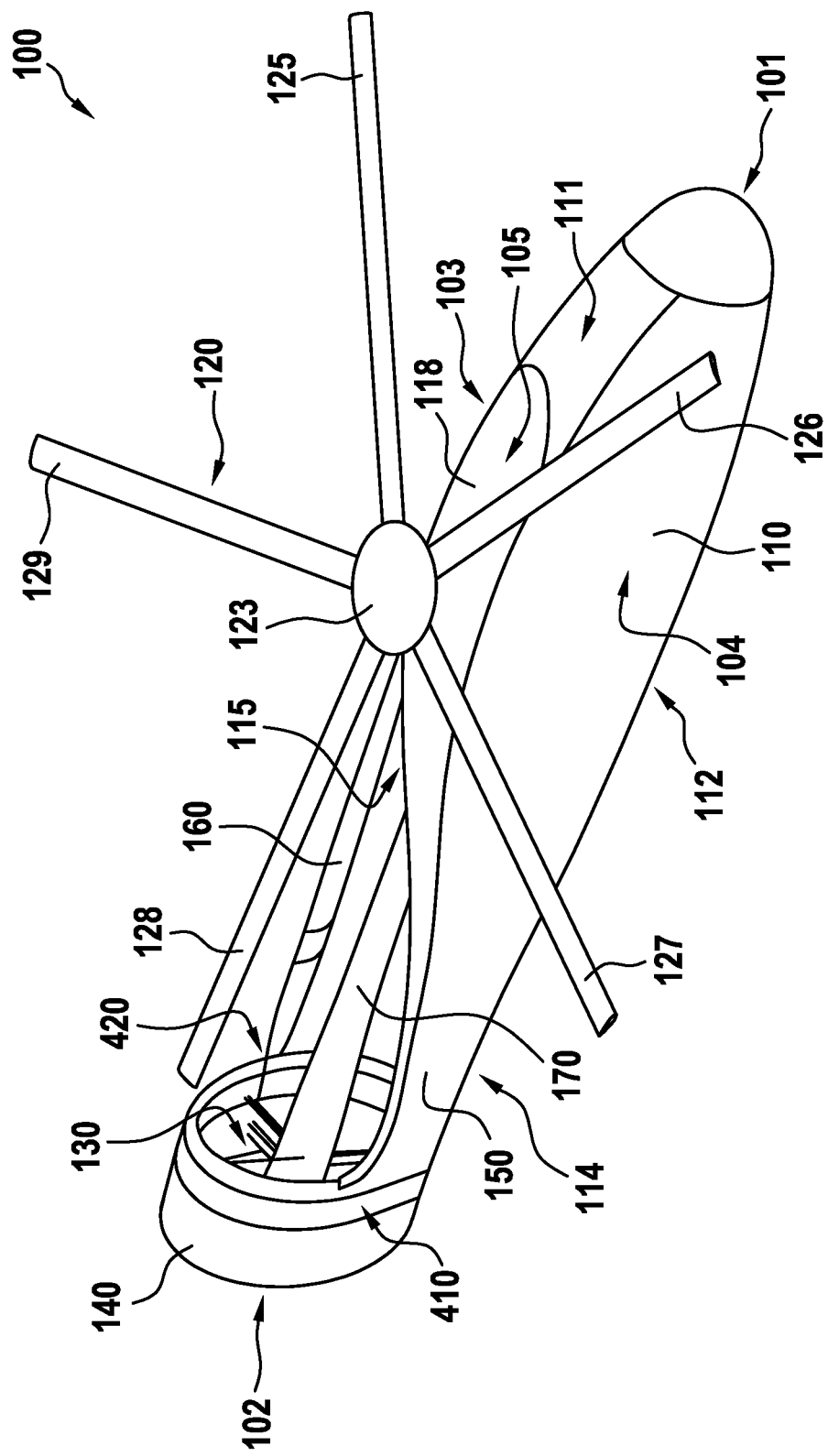
FIG. 4 shows another perspective view of the rotary wing aircraft of FIG. 1 to FIG. 3.

FIG. 4 shows the compound helicopter 100 of FIG. 1 with the fuselage 110, the main rotor 120, the propeller 130, the shrouded duct 140, and the uncovered propeller drive shaft 170. According to FIG. 1, the fuselage 110 comprises the front section 112 that merges at the recess area 115 into the rear section 114, the rear section 114 comprises the airfoil-shaped aerodynamic device 150 and the wing-type aerodynamic device 160, the propeller 130 is rotatably mounted to the shrouded duct 140 and driven by the uncovered propeller drive shaft 170, and the wing-type aerodynamic device 160 connects the upper deck 105 to the shrouded duct 140.

More particularly, FIG. 4 clarifies the merging of the front section 112 along the recess area 115 into the rear section 114 of the fuselage 110 by redirecting, i.e., deflecting the port side wall 103 of the compound helicopter 100 in the recess area 115 toward the starboard side wall 104. Furthermore, the connection of the airfoil-shaped aerodynamic device 150 and the wing-type aerodynamic device 160 to preferably almost diametrically opposed sides 410, 420 of the shrouded duct 140 is also further clarified.

Figure 5:
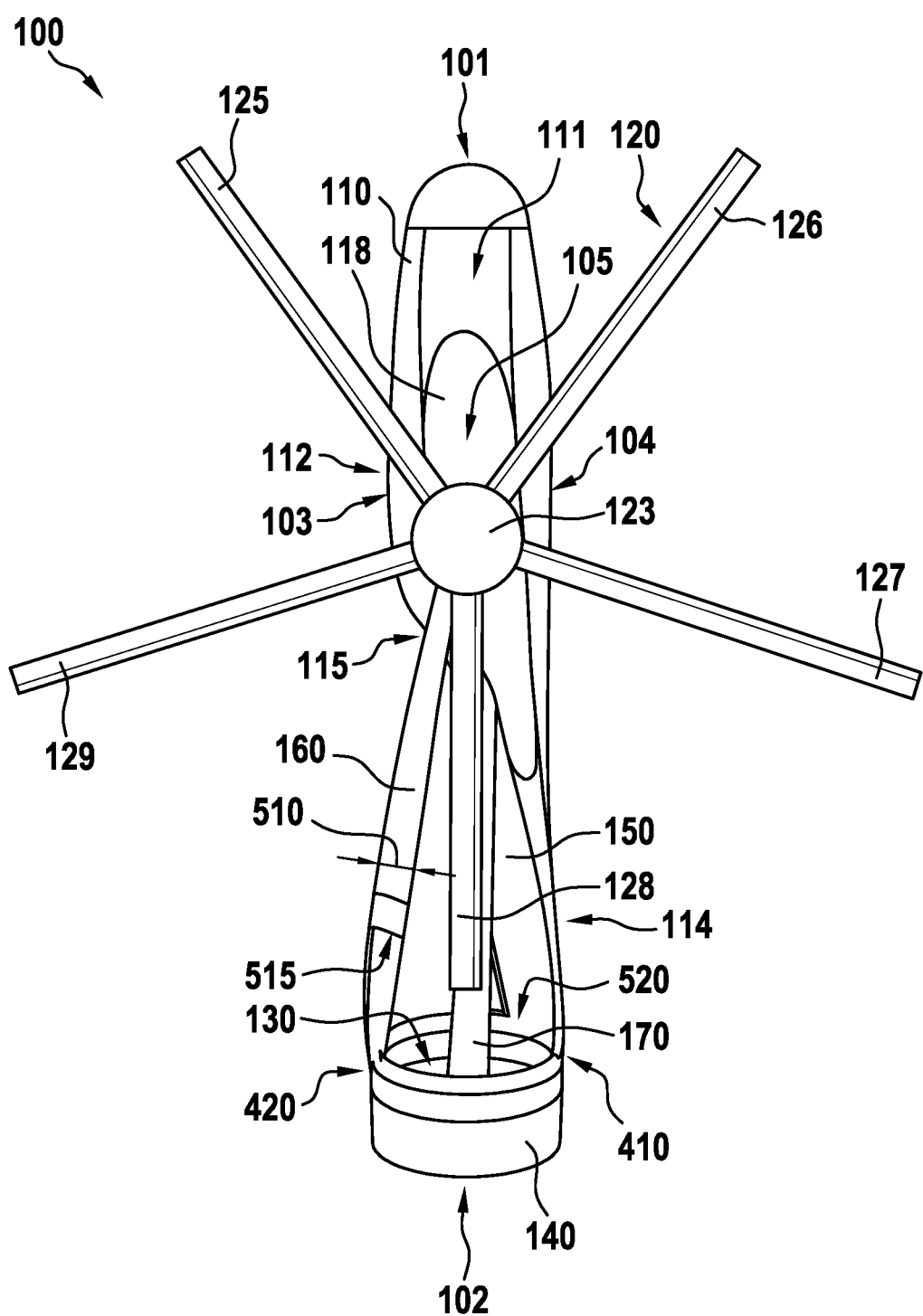
FIG. 5 shows a top view of the rotary wing aircraft of FIG. 1 to FIG. 4.

FIG. 5 shows the compound helicopter 100 of FIG. 1 with the fuselage 110, the main rotor 120, the propeller 130, the shrouded duct 140, and the uncovered propeller drive shaft 170. According to FIG. 1, the fuselage 110 comprises the front section 112 that merges at the recess area 115 into the rear section 114, the rear section 114 comprises the airfoil-shaped aerodynamic device 150 and the wing-type aerodynamic device 160, the main rotor 120 comprises the rotor blades 125, 126, 127, 128, 129 and the rotor head 123 which is arranged in the front section 112 of the fuselage 110, the propeller 130 is rotatably mounted to the shrouded duct 140 and driven by the uncovered propeller drive shaft 170, and the wing-type aerodynamic device 160 connects the upper deck 105 to the shrouded duct 140.

More particularly, FIG. 5 clarifies the arrangement of the main rotor 120 and its rotor head 123 in the front section 112 of the fuselage 110, as well as the merging of the front section 112 along the recess area 115 into the rear section 114 of the fuselage 110 by redirecting, i.e., deflecting the port side wall 103 of the compound helicopter 100 in the recess area 115 toward the starboard side wall 104. Furthermore, the connection of the airfoil-shaped aerodynamic device 150 and the wing-type aerodynamic device 160 to the almost diametrically opposed sides 410, 420 of FIG. 4 of the shrouded duct 140 is also further clarified. Preferably, at least the connection of the airfoil-shaped aerodynamic device 150 to the shrouded duct 140 is formed as a smooth transition 520, preferentially over at least 25% of an overall perimeter of the shrouded duct 140.

According to one aspect, the wing-type aerodynamic device 160 has a width 510 that increases from the upper deck 105 over a predetermined length of the wing-type aerodynamic device 160. More specifically, the width 510 illustratively starts to increase at the upper deck 105 and increases in direction of the shrouded duct 140.

The width 510 may increase such that a maximum width value is reached at an area located between 60% of the length of the rotor blades 125, 126, 127, 128, 129 and their outer ends. Preferably, the width 510 increases over at least 75% of the length of the wing-type aerodynamic device 160.

Illustratively, 75% of the length of the wing-type aerodynamic device 160 is reached at a location 515.

FIG. 6 shows the compound helicopter 100 of FIG. 1 with the fuselage 110, the main rotor 120, the propeller 130, the shrouded duct 140, and the uncovered propeller drive shaft 170. According to FIG. 1, the fuselage 110 comprises the front section 112 that merges at the recess area 115 into the rear section 114, the rear section 114 comprises the airfoil-shaped aerodynamic device 150 and the wing-type aerodynamic device 160, the propeller 130 is rotatably mounted to the shrouded duct 140 and driven by the uncovered propeller drive shaft 170, and the wing-type aerodynamic device 160 connects the upper deck 105 to the shrouded duct 140. More specifically, FIG. 6 further illustrates the smooth transition 520 from the rear section 114 to the shrouded duct 140 according to FIG. 5.

FIG. 7 shows the uncovered propeller drive shaft 170 of FIG. 1 which, according to one aspect, comprises a big diameter cylinder shaft 710. This big diameter cylinder shaft 710 has preferably a diameter comprised in a range from 5 to 10 times the diameter of a conventional tail rotor drive shaft. Preferably, the big diameter cylinder shaft 710 enables creation of the so-called Magnus effect for generating additional sideward thrust in operation from main rotor downwash of the main rotor 120 of the compound helicopter 100 of FIG. 1.

As described above at FIG. 1, the uncovered propeller drive shaft 170 and, thus, the big diameter cylinder shaft 710 preferably extends coupling- and bearing-free between the front section 112 of the fuselage 110 and the shrouded duct 140. For purposes of illustration, the big diameter cylinder shaft 710 is, therefore, shown with two suitable bearings 720, 730 at its axial ends, which are provided to rotatably support the big diameter cylinder shaft 710.

In order to enable the coupling- and bearing-free extension of the big diameter cylinder shaft 710 between the front section 112 of the fuselage 110 and the shrouded duct 140, the big diameter cylinder shaft 710 must be sufficiently stiff for a reliable and secure functioning. This may be achieved by forming the big diameter cylinder shaft 710 using carbon composites, especially high modulus fiber.

FIG. 8 shows the uncovered propeller drive shaft 170 of FIG. 1 which, according to another aspect, comprises a big diameter conical shaft 810. This big diameter conical shaft 810 has preferably a largest diameter comprised in a range from 5 to 10 times the diameter of a conventional tail rotor drive shaft. Preferably, the big diameter conical shaft 810 also enables creation of the so-called Magnus effect for generating additional sideward thrust in operation from main rotor downwash of the main rotor 120 of the compound helicopter 100 of FIG. 1.

As described above at FIG. 1, the uncovered propeller drive shaft 170 and, thus, the big diameter conical shaft 810 preferably extends coupling- and bearing-free between the front section 112 of the fuselage 110 and the shrouded duct 140. For purposes of illustration, the big diameter conical shaft 810 is, therefore, shown with two suitable bearings 820, 830 at its axial ends, which are provided to rotatably support the big diameter conical shaft 810. Preferably, the bearing 830 supports the big diameter conical shaft 810 at the shrouded duct 140 of FIG. 1.

In order to enable the coupling- and bearing-free extension of the big diameter conical shaft 810 between the front section 112 of the fuselage 110 and the shrouded duct 140, the big diameter conical shaft 810 must be sufficiently stiff for a reliable and secure functioning. This may be achieved by forming the big diameter conical shaft 810 using carbon composites, especially high modulus fiber.

Figure 9:
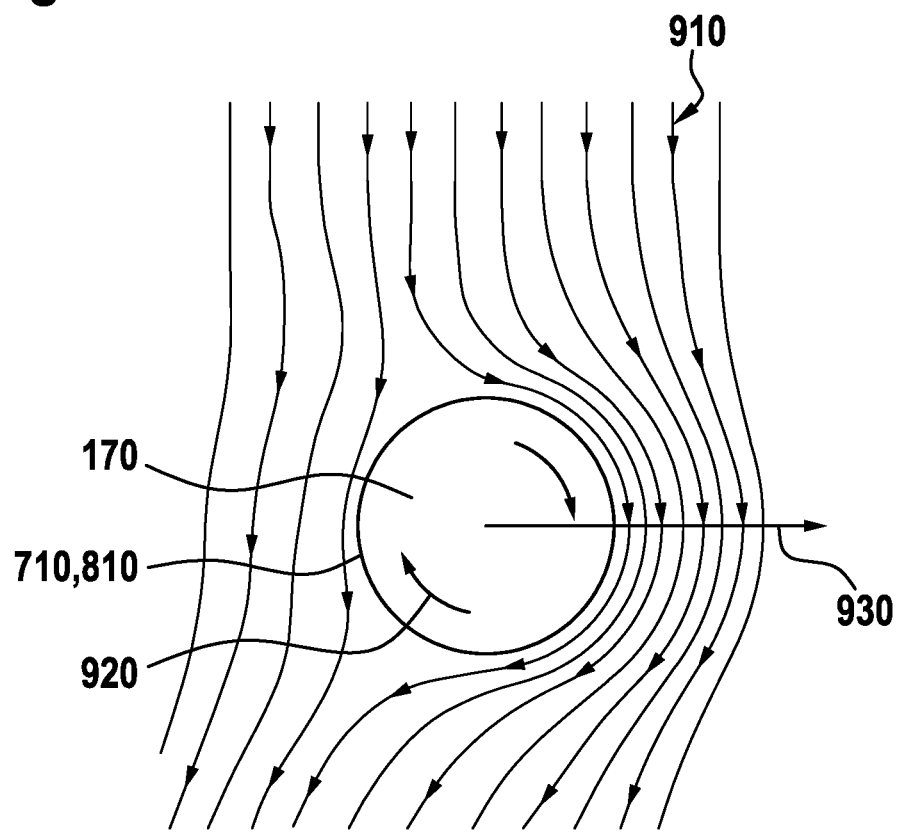
FIG. 9 shows a functional diagram of the propeller drive shaft of FIG. 7 and FIG. 8.

FIG. 9 shows the uncovered propeller drive shaft 170 of FIG. 1, which either comprises the big diameter cylinder shaft 710 of FIG. 7 or the big diameter conical shaft 810 of FIG. 8. In an illustrative operation of the main rotor 120 of the compound helicopter 100 of FIG. 1, the uncovered propeller drive shaft 170 is rotated in main rotor downwash 910 in a rotation direction 920. Thus, as a result of the Magnus effect, the uncovered propeller drive shaft 170 generates a sideward force 930. This sideward force 930, in turn, results in sideward thrust applied to the rear section 114 of the fuselage 110 of the compound helicopter 100 of FIG. 1.

It should be noted that the Magnus effect is well-known to the person skilled in the art. Therefore, for brevity and conciseness the Magnus effect and its application for generation of sideward thrust by means of the uncovered propeller drive shaft 170 is not described in more detail.

Figure 10:
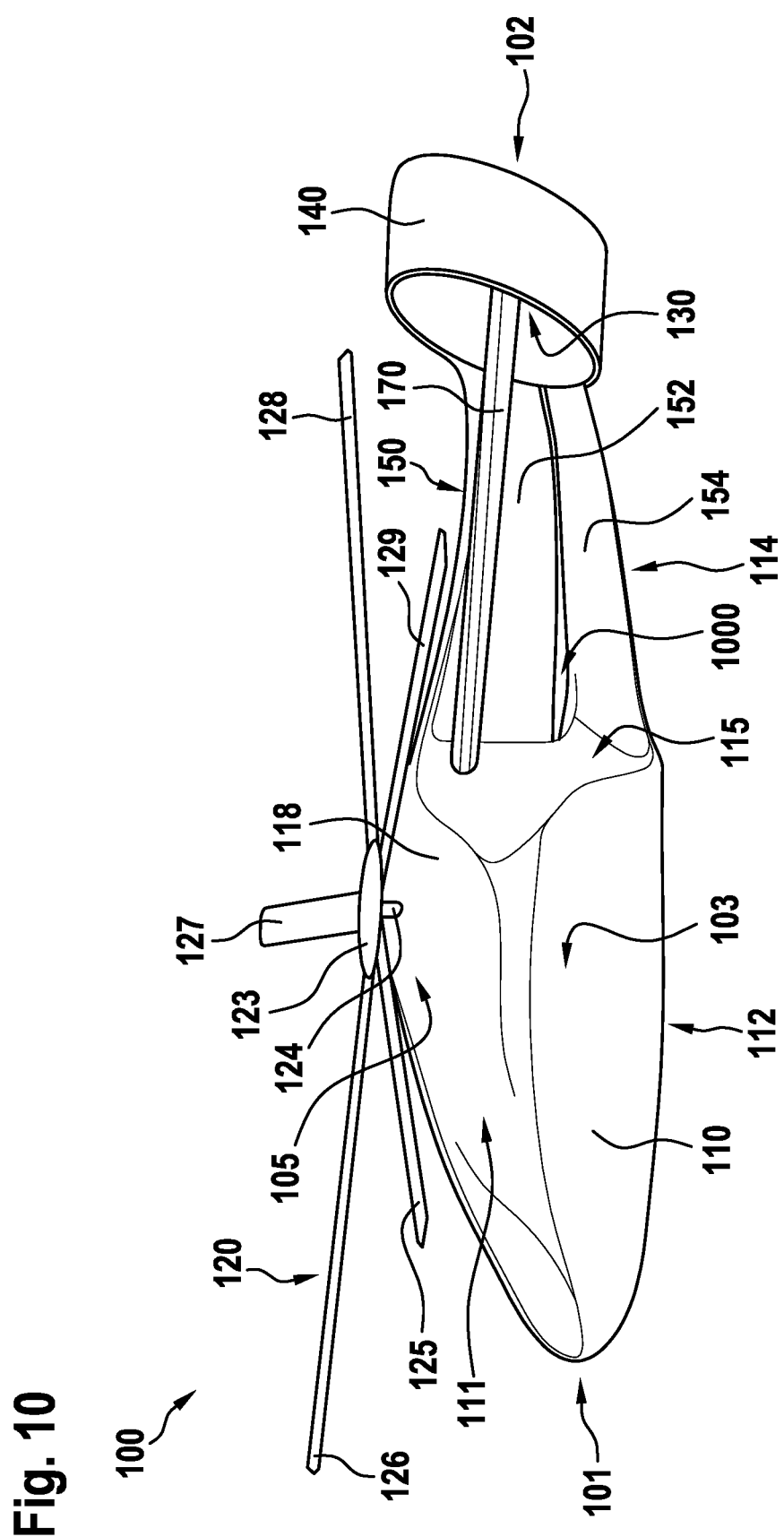
FIG. 10 shows a side view of the rotary wing aircraft of FIG. 1 to FIG. 6 with an alternative fuselage rear section.

FIG. 10 shows the compound helicopter 100 of FIG. 1 with the fuselage 110, the main rotor 120, the propeller 130, the shrouded duct 140, and the uncovered propeller drive shaft 170. However, illustration of the wing-type aerodynamic device 160 is omitted for simplicity and clarity of the drawing.

According to FIG. 1, the fuselage 110 comprises the front section 112 that merges at the recess area 115 into the rear section 114, the rear section 114 comprises the airfoil-shaped aerodynamic device 150, the main rotor 120 comprises the rotor blades 125, 126, 127, 128, 129 and the rotor head 123 which is arranged in the front section 112 of the fuselage 110, and the propeller 130 is rotatably mounted to the shrouded duct 140 and driven by the uncovered propeller drive shaft 170. However, in contrast to FIG. 1, where the rear section 114 of the fuselage 110 comprises only one airfoil-shaped aerodynamic device 150 by way of example, the rear section 114 now illustratively comprises first and second airfoil-shaped aerodynamic devices 152, 154.

The airfoil-shaped aerodynamic devices 152, 154 preferably form the rear section 114 at least partly. Illustratively, the airfoil-shaped aerodynamic devices 152, 154 are separated from each other by an air gap 1000.

Figure 11:
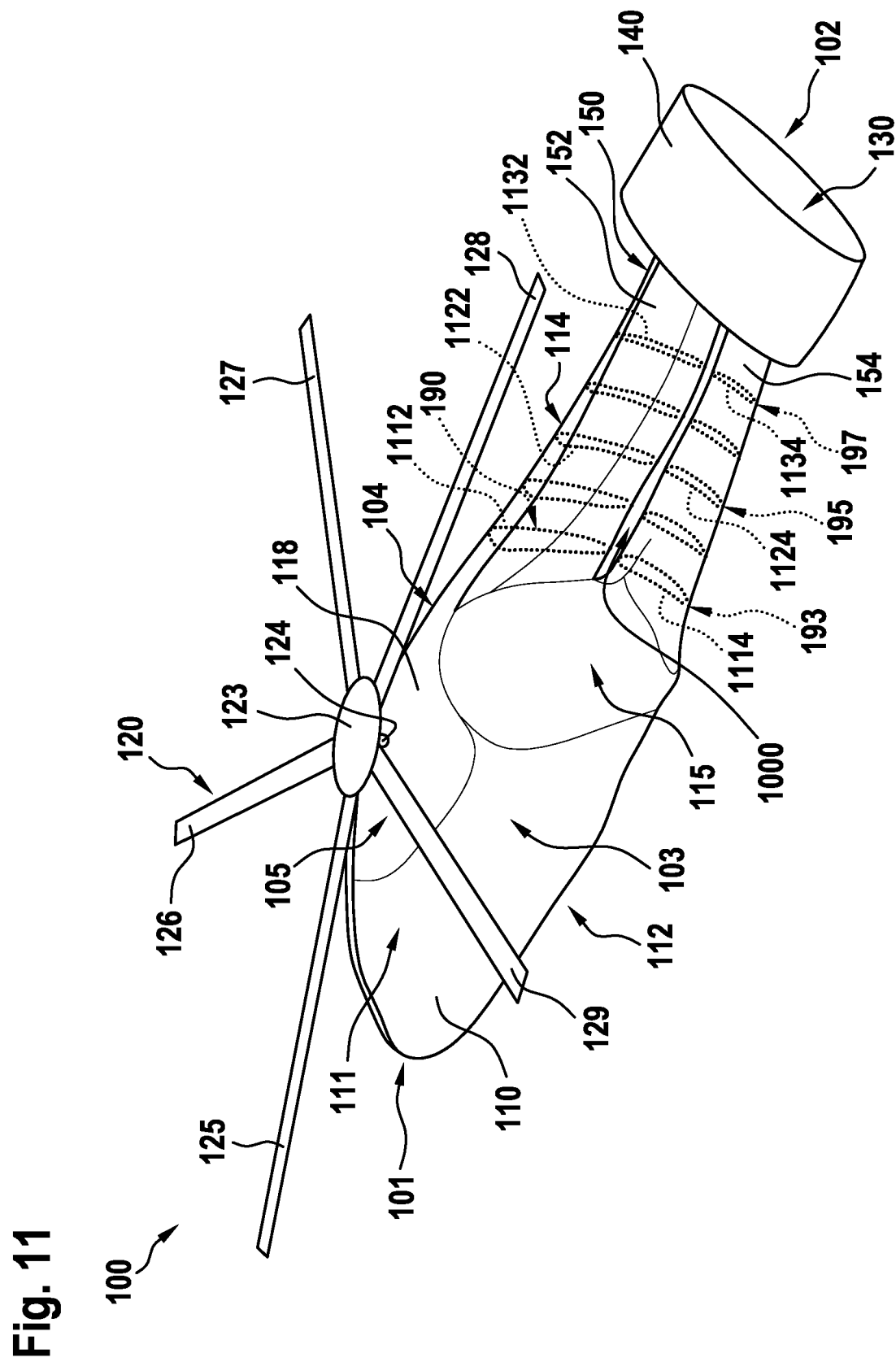
FIG. 11 shows a perspective view of the rotary wing aircraft of FIG. 10.

FIG. 11 shows the compound helicopter 100 of FIG. 10 with the fuselage 110, the main rotor 120, the propeller 130, the shrouded duct 140, and the airfoil-shaped aerodynamic devices 152, 154. However, illustration of the uncovered propeller drive shaft 170 is omitted for simplicity and clarity of the drawing.

According to FIG. 10, the fuselage 110 comprises the front section 112 that merges at the recess area 115 into the rear section 114, the rear section 114 comprises the airfoil-shaped aerodynamic devices 152, 154, the main rotor 120 comprises the rotor blades 125, 126, 127, 128, 129 and the rotor head 123 which is arranged in the front section 112 of the fuselage 110, and the propeller 130 is rotatably mounted to the shrouded duct 140. The airfoil-shaped aerodynamic devices 152, 154 are separated from each other by the air gap 1000.

By way of example, the airfoil-like shaping of the airfoil-shaped aerodynamic devices 152, 154 is illustrated by means of the asymmetrical cross-sectional profile 190 with the series of cross-sectional profiles 193, 195, 197 according to FIG. 1. Each one of the cross-sectional profiles 193, 195, 197 is now illustratively split into two separate cross-sectional profiles such that a first series of cross-sectional profiles 1112, 1122, 1132 is associated with the airfoil-shaped aerodynamic device 152, and a second series of cross-sectional profiles 1114, 1124, 1134 is associated with the airfoil-shaped aerodynamic device 154. Illustratively, the cross-sectional profiles 1112, 1114 correspond to the cross-sectional profile 193, the cross-sectional profiles 1122, 1124 correspond to the cross-sectional profile 195, and the cross-sectional profiles 1132, 1134 correspond to the cross-sectional profile 197. Preferably, the cross-sectional profiles 1112, 1114, 1122, 1124, 1132, 1134 are at least approximately C-shaped.

Figure 12:
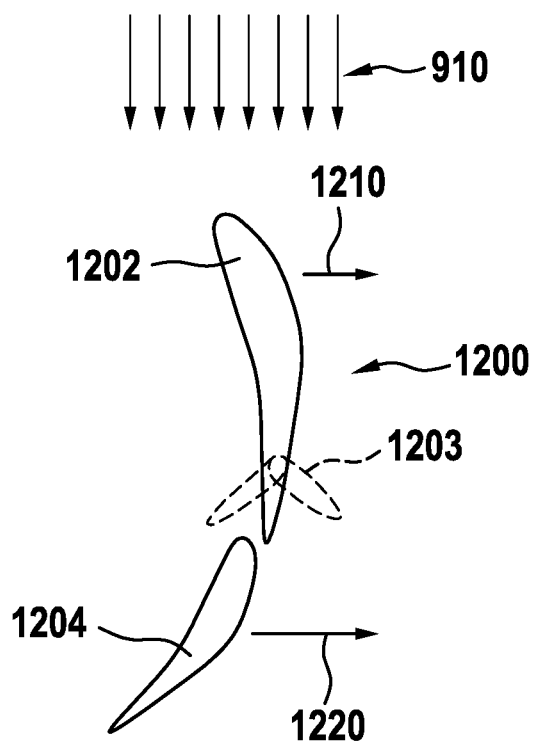
FIG. 12 shows a functional diagram of the alternative fuselage rear section of FIG. 10 and FIG. 11.

FIG. 12 shows an alternative airfoil-shaped aerodynamic device 1200 which may be used with the compound helicopter 100 instead of the airfoil-shaped aerodynamic device 150 described above. According to one aspect, the airfoil-shaped aerodynamic device 1200 comprises at least one deflectable flap 1203. Preferably, the deflectable flap 1203 is actuatable, e.g., in response to pilot input.

By way of example, the airfoil-shaped aerodynamic device 1200 has first and second airfoil-shaped aerodynamic devices 1202, 1204, similar to the airfoil-shaped aerodynamic devices 152, 154 described above at FIG. 10 and FIG. 11. The airfoil-shaped aerodynamic device 1202 is provided to generate sideward thrust 1210 for main rotor anti-torque from main rotor downwash, which is labeled with the reference sign 910 similar to FIG. 9. Similarly, the airfoil-shaped aerodynamic device 1204 is provided to generate sideward thrust 1220 for main rotor anti-torque from the main rotor downwash 910. Illustratively, the airfoil-shaped aerodynamic device 1202 is provided with the deflectable flap 1203 to enable adjustment of the generated sideward thrust 1210 to a respectively required magnitude.

Figure 13:
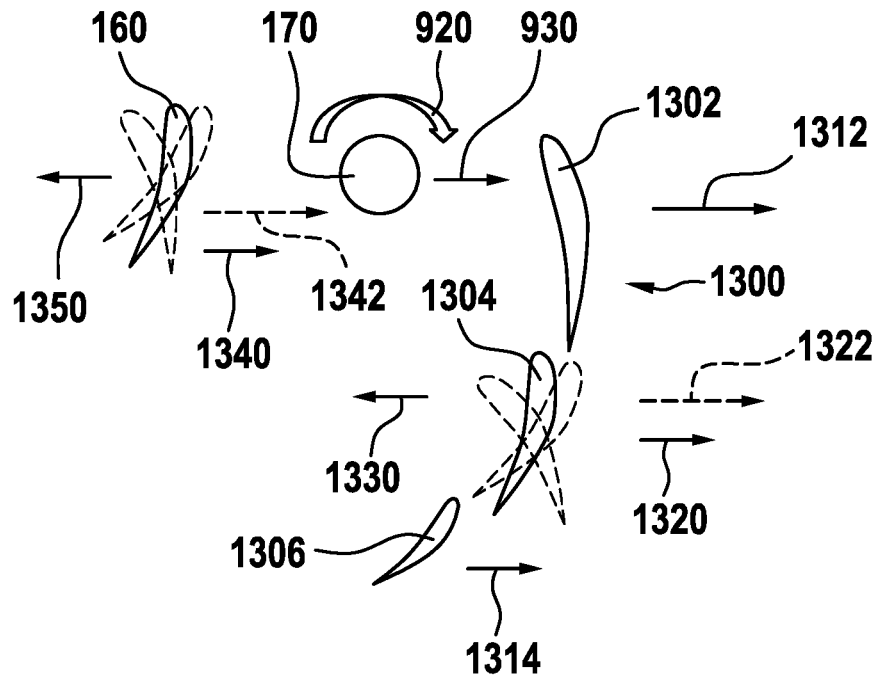
FIG. 13 shows a functional diagram of a further alternative fuselage rear section for the rotary wing aircraft of FIG. 10 and FIG. 11.

FIG. 13 shows the wing-type aerodynamic device 160 and the uncovered propeller drive shaft 170 of the compound helicopter 100 described above, together with another alternative airfoil-shaped aerodynamic device 1300 that may be used with the compound helicopter 100 instead of the airfoil-shaped aerodynamic device 150 described above. According to FIG. 9, the uncovered propeller drive shaft 170 is rotatable in the rotation direction 920 to create by means of the Magnus effect the sideward thrust 930. However, instead of being fixedly mounted, the wing-type aerodynamic device 160 is now preferably rotatable to enable adjustment of the generated sideward thrust.

More specifically, the wing-type aerodynamic device 160 is preferably rotatable around its longitudinal axis such that the magnitude of respectively generated sideward thrust may either be adjusted, as symbolized with two different sideward thrust vectors 1340, 1342, or inverted, as illustrated with an inverted sideward thrust vector 1350. Preferably, the wing-type aerodynamic device 160 is rotatable in response to pilot input.

According to one aspect, the airfoil-shaped aerodynamic device 1300 now comprises three separate airfoil-shaped aerodynamic devices 1302, 1304, 1306, which are respectively provided to generate sideward thrust for main rotor anti-torque from main rotor downwash. By way of example, the airfoil-shaped aerodynamic device 1302 generates sideward thrust 1312, and the airfoil-shaped aerodynamic device 1306 generates sideward thrust 1314.

Preferably, at least one of the three separate airfoil-shaped aerodynamic devices 1302, 1304, 1306 is rotatable around its longitudinal axis, such that the magnitude of respectively generated sideward thrust may either be adjusted, or inverted. By way of example, the airfoil-shaped aerodynamic device 1304 is rotatable around its longitudinal axis such that the magnitude of respectively generated sideward thrust may either be adjusted, as symbolized with two different sideward thrust vectors 1320, 1322, or inverted, as illustrated with an inverted sideward thrust vector 1330. Preferably, the airfoil-shaped aerodynamic device 1304 is rotatable in response to pilot input.

According to one aspect, the rotatable airfoil-shaped aerodynamic device 1304 and/or the wing-type aerodynamic device 160 have forward and rearward connections to the front section 112 and the shrouded duct 140 of the compound helicopter 100 described above with a reduced diameter such that a more circular cross section is provided at these forward and rearward connections. Thus, drag that is generated in rotated position of the rotatable airfoil-shaped aerodynamic device 1304 and/or the wing-type aerodynamic device 160 at the forward and rearward connections is reduced. Alternatively, the forward and rearward connections may have an inclined end profile.

Figure 14:
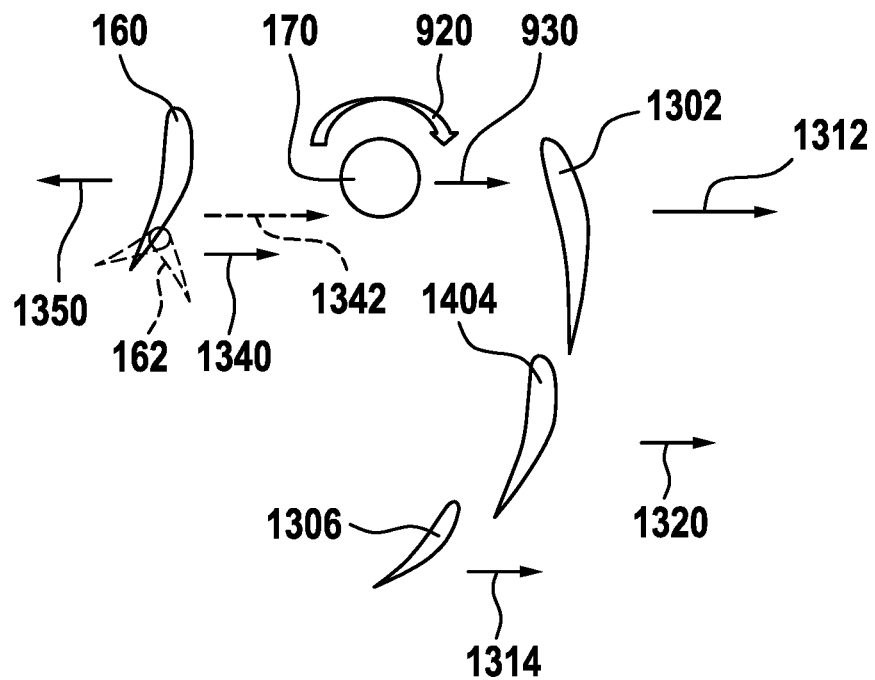
FIG. 14 shows a functional diagram of still another alternative fuselage rear section for the rotary wing aircraft of FIG. 10 and FIG. 11.

FIG. 14 shows the arrangement of FIG. 13 with the wing-type aerodynamic device 160, the uncovered propeller drive shaft 170, and the airfoil-shaped aerodynamic devices 1302, 1306. However, in contrast to FIG. 13 the rotatable airfoil-shaped aerodynamic device 1304 is now replaced by a fixedly mounted airfoil-shaped aerodynamic device 1404 that is merely intended to generate a fixed amount of sideward thrust, e.g., the sideward thrust 1320 of FIG. 13. Furthermore, instead of being entirely rotatable as described at FIG. 13, the wing-type aerodynamic device 160 now merely comprises a deflectable flap 162 that enables adjustment of the magnitude of respectively generated sideward thrust, as symbolized with the two different sideward thrust vectors 1340, 1342, or its inversion, as illustrated with an inverted sideward thrust vector 1350.

At this point, it should be noted that modifications to the above-described realizations are within the common knowledge of the person skilled in the art and, thus, also considered as being part of the present disclosure. For instance, the airfoil-shaped aerodynamic devices described above may be realized with one, two or three separate airfoil-shaped aerodynamic devices. However, more than three separate airfoil-shaped aerodynamic devices may likewise be implemented. Furthermore, the shrouded duct described above may at least partly be reduced in its length, i.e., have a reduced or recessed area such as a cut-out which may e.g., be arranged in a bottom part of the shrouded duct between the airfoil-shaped aerodynamic device and the wing-type aerodynamic device. Moreover, respective leading and trailing edges of the shrouded duct described above may be moveable forward and aft in direction of the roll axis. Further exemplary modifications are described below with reference to FIG. 15 and FIG. 16.

Figure 15:
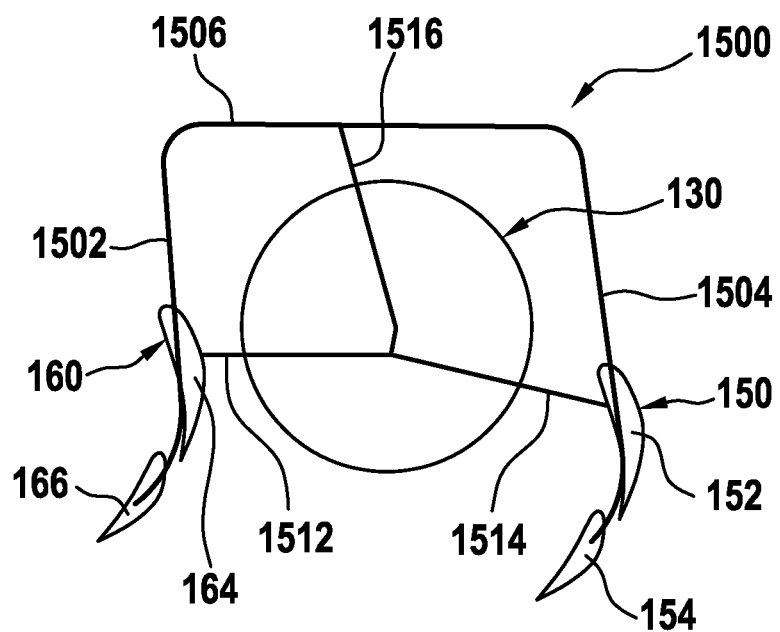
FIG. 15 shows a rear view of a modified aft region of the rotary wing aircraft of FIG. 1 or FIG. 10.

FIG. 15 shows the propeller 130 and the airfoil-shaped aerodynamic device 150 as well as the wing-type aerodynamic device 160 of the compound helicopter 100 described above. By way of example, the airfoil-shaped aerodynamic device 150 is shown with the two airfoil-shaped aerodynamic devices 152, 154, as e.g., described above at FIG. 10.

However, the wing-type aerodynamic device 160 is now shown with two separate wing-type aerodynamic devices 164, 166. Furthermore, instead of being rotatably mounted to the shrouded duct 140 as described above, the propeller 130 is now rotatably mounted to a stabilizer arrangement 1500 with vertical stabilizers 1502, 1504 and a horizontal stabilizer 1506, by means of horizontal struts 1512, 1514 and a vertical strut 1516. In this configuration, the vertical stabilizers 1502, 1504 are preferably mounted to the airfoil-shaped aerodynamic device 150 and the wing-type aerodynamic device 160, respectively.

Figure 16:
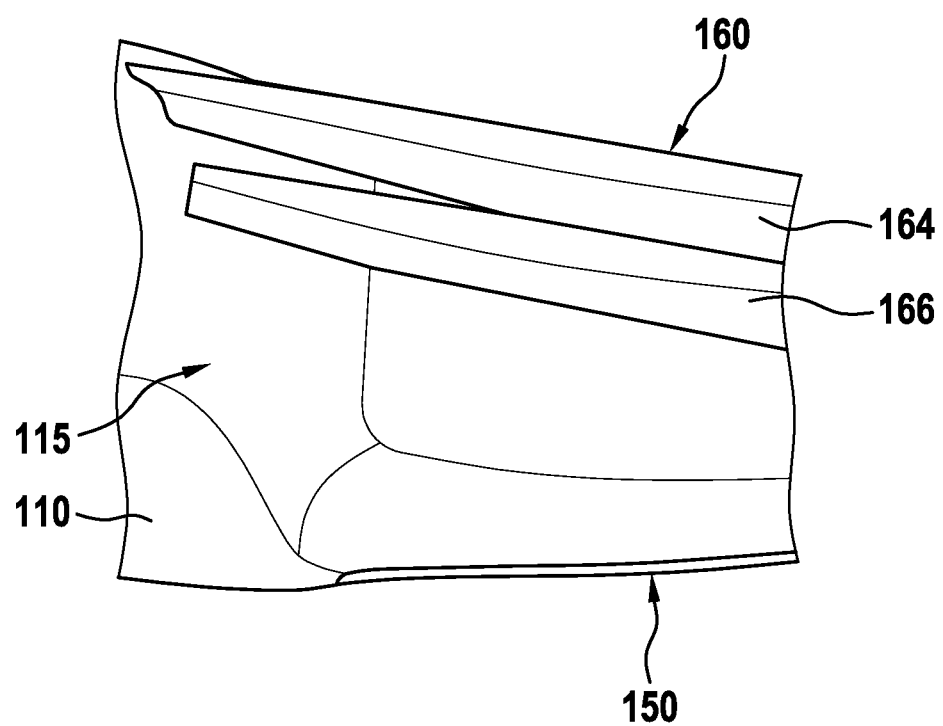
FIG. 16 shows a cut-out of the rotary wing aircraft of FIG. 1 to FIG. 6 with an additional wing-type aerodynamic device.

FIG. 16 shows a portion of the compound helicopter 100 of FIG. 1 or FIG. 10 with the fuselage 110, the recess area 115, the airfoil-shaped aerodynamic device 150, and the wing-type aerodynamic device 160. For purposes of illustration, the wing-type aerodynamic device 160 is now formed by the two separate wing-type aerodynamic devices 164, 166 according to FIG. 15.

REFERENCE LIST 100 rotary wing aircraft
101 aircraft nose region
102 aircraft aft region
103 port side wall
104 starboard side wall
105 aircraft upper deck
110 fuselage
111 cabin
112 fuselage front section
114 fuselage rear section
115 recess area
116 fuselage upper limit
118 upper deck cowling
120 main rotor
122 rotor plane
123 rotor head
124 rotor mast
125, 126, 127, 128, 129 rotor blades
130 propeller
140 shrouded duct
150 airfoil-shaped aerodynamic device
152, 154 separate airfoil-shaped aerodynamic devices
160 wing-type aerodynamic device
162 deflectable flap
164, 166 separate wing-type aerodynamic devices
170 uncovered propeller drive shaft
180 symmetrical cross-sectional profile of front section
190 asymmetrical cross-sectional profile of rear section
191, 193, 195, 197 asymmetrical cross-sectional profiles
310 bottom line
320 bottom line inclination angle
330 horizontal reference plane
340 aircraft rear door
350 swept back structure
410, 420 opposite shrouded duct sides
510 width of wing-type aerodynamic device
515 75% length limit
520 smooth transition
710 big diameter cylinder shaft
720, 730 shaft bearings
810 big diameter conical shaft
820, 830 shaft bearings
910 main rotor downwash
920 propeller drive shaft rotation direction
930 generated sideward force due to Magnus effect
1000 gap
1112, 1114, 1122, 1124, 1132, 1134 profile sections
1200 airfoil-shaped aerodynamic device
1202, 1204 airfoil-shaped aerodynamic devices
1203 deflectable flap
1210, 1220 sideward thrust
1300 airfoil-shaped aerodynamic device arrangement
1302, 1306 airfoil-shaped aerodynamic devices
1304 rotatable airfoil-shaped aerodynamic device
1312, 1314, 1320, 1322, 1330, 1340, 1342, 1350 sideward thrust
1404 airfoil-shaped aerodynamic device
1500 stabilizer arrangement
1502, 1504 vertical stabilizers
1506 horizontal stabilizer
1512, 1514 horizontal struts
1516 vertical strut
P aircraft pitch axis
R aircraft roll axis
Y aircraft yaw axis

What is claimed is:

1. A rotary wing aircraft that extends along an associated roll axis between a nose region and an aft region and that comprises a fuselage with a front section and a rear section, the rotary wing aircraft comprising:
   a main rotor that is rotatably mounted at the front section,
   a shrouded duct that is arranged in the aft region, and
   a propeller that is rotatably mounted to the shrouded duct,
   wherein the rear section extends between the front section and the shrouded duct and comprises an asymmetrical cross-sectional profile in direction of the associated roll axis,
   wherein the rear section is configured to generate sideward thrust for main rotor anti-torque from main rotor downwash, and
   wherein the front section comprises a port side wall and a starboard side wall, and wherein the rear section extends in prolongation to one of the port side wall or the starboard side wall.

2. The rotary wing aircraft of claim 1 wherein the rear section comprises at least one airfoil-shaped aerodynamic device that extends from the front section to the shrouded duct, and wherein the at least one airfoil-shaped aerodynamic device is configured to generate sideward thrust for main rotor anti-torque from main rotor downwash.

3. The rotary wing aircraft of claim 2 wherein the at least one airfoil-shaped aerodynamic device comprises a deflectable flap.

4. The rotary wing aircraft of claim 1 wherein the rear section comprises at least one rotatable airfoil-shaped aerodynamic device that is configured to generate sideward thrust for main rotor anti-torque from main rotor downwash, and wherein the at least one rotatable airfoil-shaped aerodynamic device is rotatable to enable adjustment of the generated sideward thrust.

5. The rotary wing aircraft of claim 1 wherein the asymmetrical cross-sectional profile is at least approximately C-shaped.

6. The rotary wing aircraft of claim 1 further comprising at least one wing-type aerodynamic device that extends between the front section and the shrouded duct, wherein the at least one wing-type aerodynamic device and the rear section are connected to opposite sides of the shrouded duct.

7. The rotary wing aircraft of claim 6 wherein the at least one wing-type aerodynamic device is mounted to the shrouded duct and to an aircraft upper deck and has a width that increases from the aircraft upper deck over a predetermined length of the at least one wing-type aerodynamic device, preferably over at least 75% of the length of the at least one wing-type aerodynamic device.

8. The rotary wing aircraft of claim 6 wherein the at least one wing-type aerodynamic device is configured to generate sideward thrust for main rotor anti-torque from main rotor downwash.

9. The rotary wing aircraft of claim 8 wherein the at least one wing-type aerodynamic device is rotatable to enable adjustment of the generated sideward thrust.

10. The rotary wing aircraft of claim 6
wherein the at least one wing-type aerodynamic device comprises a deflectable flap.

11. The rotary wing aircraft of claim 1 further comprising an uncovered propeller drive shaft that is configured to create a Magnus effect upon rotation in main rotor downwash.

12. The rotary wing aircraft of claim 11
wherein the uncovered propeller drive shaft extends coupling- and bearing-free between the front section and the shrouded duct.

13. The rotary wing aircraft of claim 11
wherein the uncovered propeller drive shaft comprises a big diameter cylinder shaft or a big diameter conical shaft.

14. The rotary wing aircraft of claim 1 which is embodied as a compound helicopter, wherein the front section of the fuselage forms a cabin for passengers and/or cargo, wherein the propeller is a pusher propeller, and wherein the main rotor forms a single rotor plane.

* * * * *